Oct. 3, 1933.   J. E. COVEY   1,928,718
SKIN INCISOR
Filed Dec. 2, 1931

John E. Covey
INVENTOR

WITNESS.

Patented Oct. 3, 1933

1,928,718

UNITED STATES PATENT OFFICE 1,928,718

SKIN INCISOR

John E. Covey, Chicago, Ill., assignor to Swift and Company, Chicago, Ill., a corporation of Illinois Application December 2, 1931. Serial No. 578,456

3 Claims. (Cl. 17—1)

The invention relates to a device for making incisions in the skin of cured bacon bellies.

The object of the present invention is to provide a simple, practical and efficient rotary power driven knife of strong, durable and inexpensive construction designed for making incisions in the skin of cured bacon bellies to form ribbon-like partially severed strips of skin adapted to permit a skewer or skewer-like member of a hanger to be inserted beneath them with the major portion of the skewer exteriorly of the edible portion of the belly, and thereby avoid the holes necessarily made in bacon bellies by hook or comb hangers or other hangers of a similar type.

Figure 1:
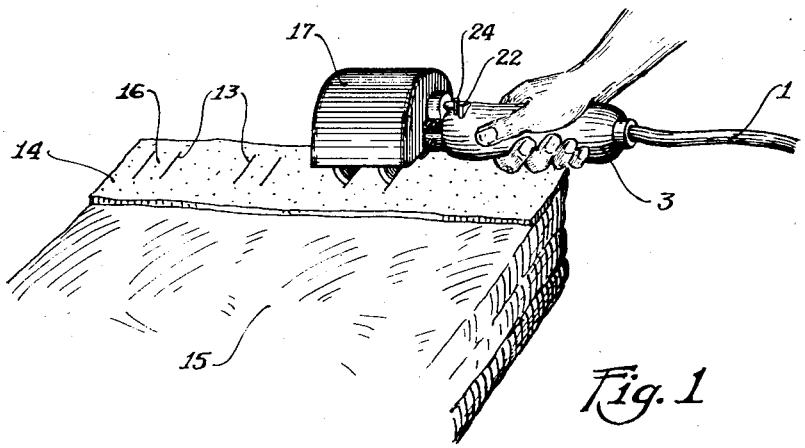
Figure 1 is a perspective view of an incision-making device constructed in accordance with this invention and illustrating the manner of making incisions in the skin of a cured bacon belly.
Figure 2:
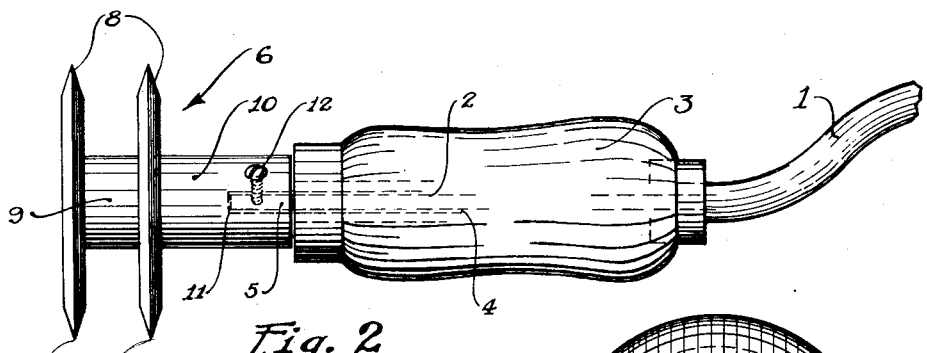
Fig. 2 is an enlarged side elevation of the incision-making device.
Figure 4:
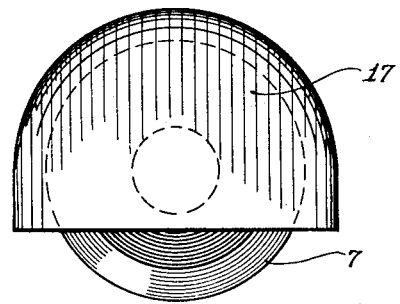
Fig. 4 is an end elevation of the device.
Figure 3:
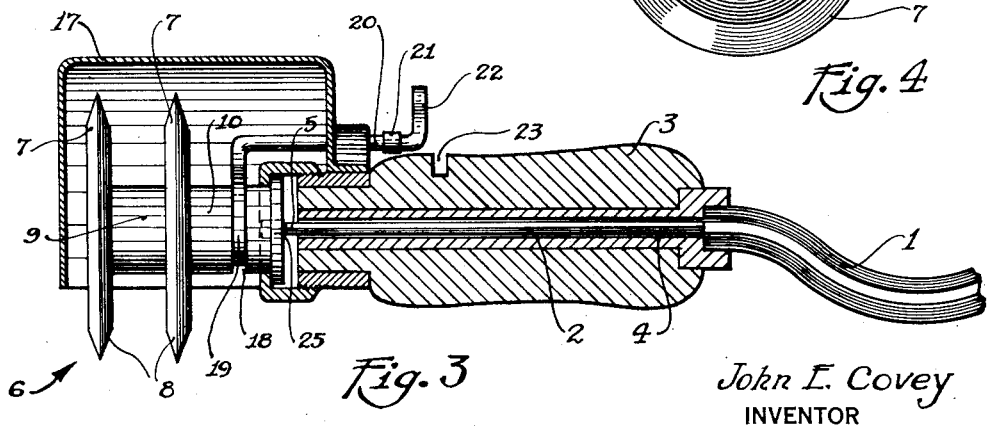
Fig. 3 is a longitudinal sectional view of another embodiment of the device.

In the accompanying drawing, in which is illustrated the preferred embodiment of the invention, the incision-making device consists of a rotary power driven knife connected by a flexible shaft 1 with a suitable motor (not shown). The motor is preferably an electric motor, but any suitable motor may, of course, be employed, as will be understood.

The flexible shaft is provided at its outer end with a spindle 2 upon which is mounted a handle or grip 3 provided with a longitudinal opening 4 having suitable bearings for the spindle 2 of the flexible shaft 1. The spindle has a terminal projecting portion 5 extending beyond the outer end of the handle 3 and forming an attaching portion for a rotary cutter 6.

The rotary cutter 6 consists of spaced disk blades 7 beveled at the periphery at opposite sides thereof at 8 to form a peripheral cutting edge which may be either toothed or plain, as desired. The spaced disks are connected by an intervening hub 9, and while two disks are shown in the accompanying drawing, any number may, of course, be employed. The rotary cutter is provided at its inner end with a sleeve extension 10 preferably of the same diameter as the hub and projecting from the inner rotary blade and having a longitudinal socket 11 for the reception of the projecting attaching portion 5 of the spindle 2 by suitable fastening means which may consist of a clamping screw 12 threaded into the sleeve 10 and engaging the projecting portion of the spindle, which is preferably provided with a depression or seat to receive the end of the screw. The projecting portion of the spindle may be either circular or of any non-circular shape in cross section.

The spaced blades of the rotary cutter are adapted, as illustrated in Fig. 1 of the drawing, to make short parallel incisions 13 in the skin 14 of a cured bacon belly 15, leaving narrow ribbon-like portions 16 of the skin between the spaced parallel incisions. This will permit a skewer or skewer-like member of a bacon hanger to be readily inserted beneath the ribbon-like portion 16 of the skin, with the major portion of the skewer or skewer-like member out of contact with the edible portion of the bacon belly. Also this will obviate the holes which are necessarily made by hook and comb hangers and other hangers of a similar type. In Fig. 1 of the drawing a strip of skin is left across one end of the bacon belly, the rest of the skin being removed therefrom, but the incisions may, of course, be made in the skin of a bacon belly having none of the skin removed.

To insert a skewer or skewer-like member with a sharp point through the skin without making these incisions is slow and difficult, and regularity of position cannot be depended upon when a skewer is inserted in this manner. An ordinary pointed knife tool has been tried for making the parallel incisions 13, but this has proved entirely unsatisfactory, for the reason that the force necessary to penetrate the skin would cause the knife to cut deep into the belly. When a knife of this character was equipped with a guard to regulate the depth of the incision, the tough skin would give enough to allow the guard to rest upon the surface of the skin without the knife penetrating the same. The small rotary power driven knife of the present invention requires only a slight touch of the device to the skin to make the parallel incisions, which may be accurately placed so that the skewer or skewer-like member will occupy the proper position in the skin of the bacon belly.

Where desired the device may be provided with a guard 17. It is clear that while a direct drive would be perfectly satisfactory under normal conditions, it might be desired to interpose a clutch between the source of power and the knives.

I have shown a convenient method of disconnecting the knives from source of power. Provide a groove 18 in sleeve 10 to accommodate member 19, which may be either a ring or U-shaped, permitting the rotation of sleeve 10 without friction. Handle 20 of member 19 is provided with swivel 21 permitting the rotation of trigger 22, in order that when desired trigger 22 may be fastened in slot 23, which is provided in handle 3, immediately behind knob 24.

It will be readily seen that backward and forward manipulation of trigger 22 causes recess 25 in sleeve 10 to slip over the end 5 of spindle 2, which is preferably rectangular in cross-section and fits tightly into recess 25, thus causing the knives to rotate.

It will also be seen that swivel 21 permits trigger 22 to be rotated and placed in recess 23 behind knob 24, obviating possibility of end 5 of spindle 2 becoming disengaged from the recess 25.

What is claimed is:

1. A device for making skin incisions, including a flexible power driven shaft provided with a terminal spindle, a handle mounted on the spindle, the latter being provided with an extension projecting beyond the outer end of the handle, and a rotary cutter carrying sleeve having a detachable driving connection with the projecting portion of the spindle and arranged at the outer end of the handle, which cutter carrying sleeve is provided with a plurality of spaced parallel circular cutting blades for making parallel skin incisions.

2. In a cutting device for making skin incisions, a handle or gripping member having a longitudinally extending opening and constructed so as to provide a bearing member for a spindle, a spindle in said bearing member the rear end of which spindle is connected to a flexible power driven shaft, an annular socket member providing a bearing for a cutter carrying sleeve, which annular socket member is carried by and has a screw threaded connection with the forward end of the handle or gripping member, a cutter carrying sleeve rotatively mounted in said annular socket member but in such a manner as to permit a limited longitudinal movement to and from a forward inoperative position and rearward operative position, said sleeve having a collar at the rear end thereof for insuring and maintaining of the rear end portion of the sleeve within the annular socket member and a socket portion, spaced cutters carried by said sleeve, and a trigger member cooperatively arranged with respect to the sleeve for moving the sleeve longitudinally, said handle having a slotted portion, and said trigger member being constructed so that when moving the trigger member rearwardly a portion thereof can be caused to enter the slot and thus hold the cutter carrying sleeve in its rearward position whereat there exists driving engagement between the forward end of the spindle and the socket portion at the rear end of the sleeve.

3. In a cutting device for making skin incisions, a handle or gripping member having a longitudinally extending opening and constructed so as to provide a bearing member for a spindle, a spindle in said bearing member the rear end of which spindle is connected to a flexible power driven shaft, an annular socket member providing a bearing for a cutter carrying sleeve, which annular socket member is carried by and has a screw threaded connection with the forward end of the handle or gripping member, a cutter carrying sleeve rotatively mounted in said annular socket member but in such a manner as to permit a limited longitudinal movement to and from a forward inoperative position and rearward operative position, said sleeve having a collar at the rear end thereof for insuring and maintaining of the rear end portion of the sleeve within the annular socket member and a socket portion, spaced cutters carried by said sleeve, and a trigger member cooperatively arranged with respect to the sleeve for moving the sleeve longitudinally, said handle having a slotted portion, and a guard member carried by said handle, said guard member extending over the cutter carrying sleeve, a bearing in said guard member, a trigger member operative in said bearing, said trigger member being constructed so that when moving the trigger member rearwardly a portion thereof can be caused to enter the slot and thus hold the cutter carrying sleeve in its rearward position whereat there exist driving engagement between the forward end of the spindle and the socket portion at the rear end of the sleeve.

JOHN E. COVEY.